March 8, 1932. A. SHARP ET AL 1,848,274
BUTTER CUTTING AND BLOCK FORMING MACHINE
Filed Dec. 27, 1929 3 Sheets-Sheet 3
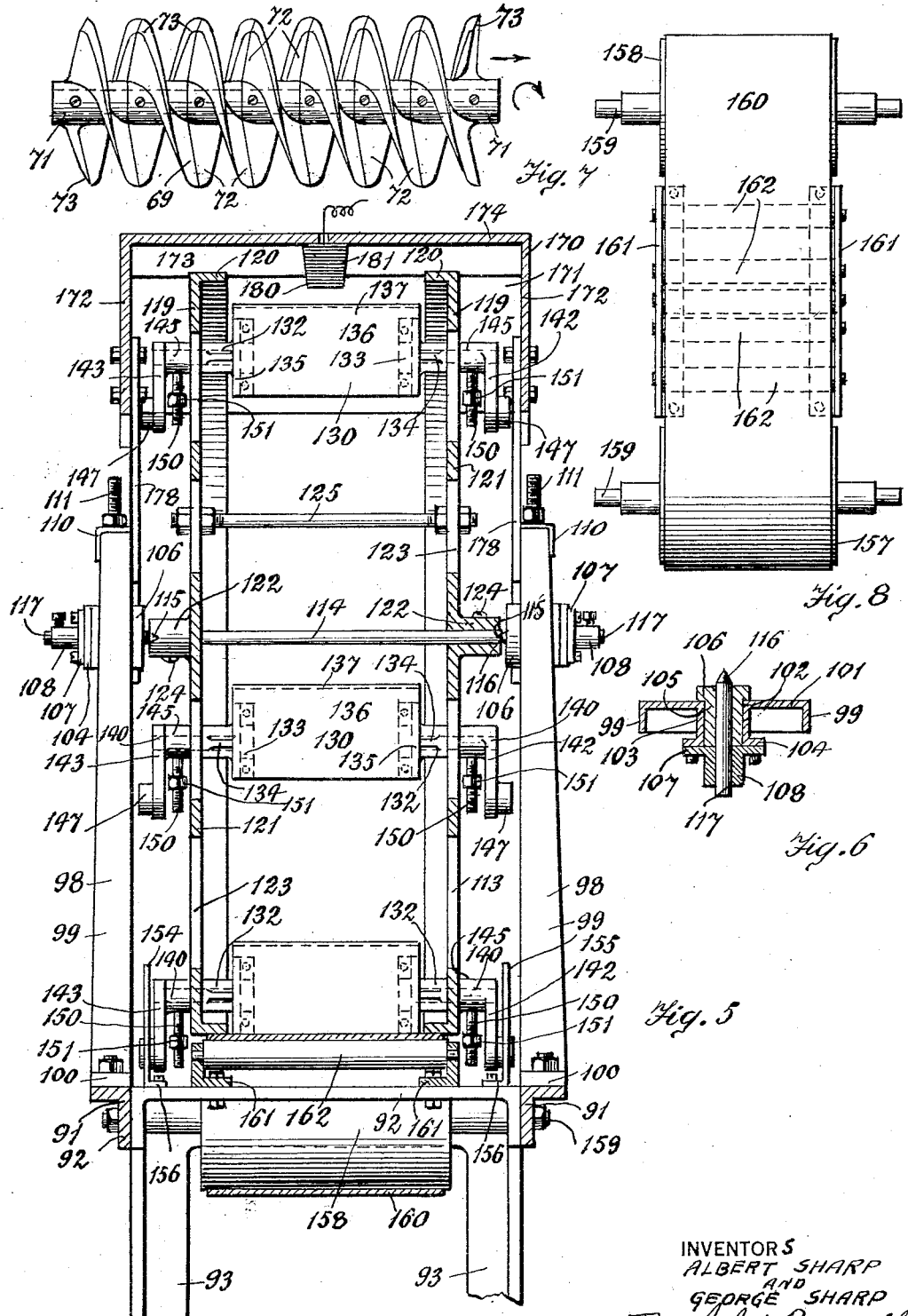
INVENTORS
ALBERT SHARP
AND
GEORGE SHARP
By N A de Bonneville
ATTORNEY Patented Mar. 8, 1932

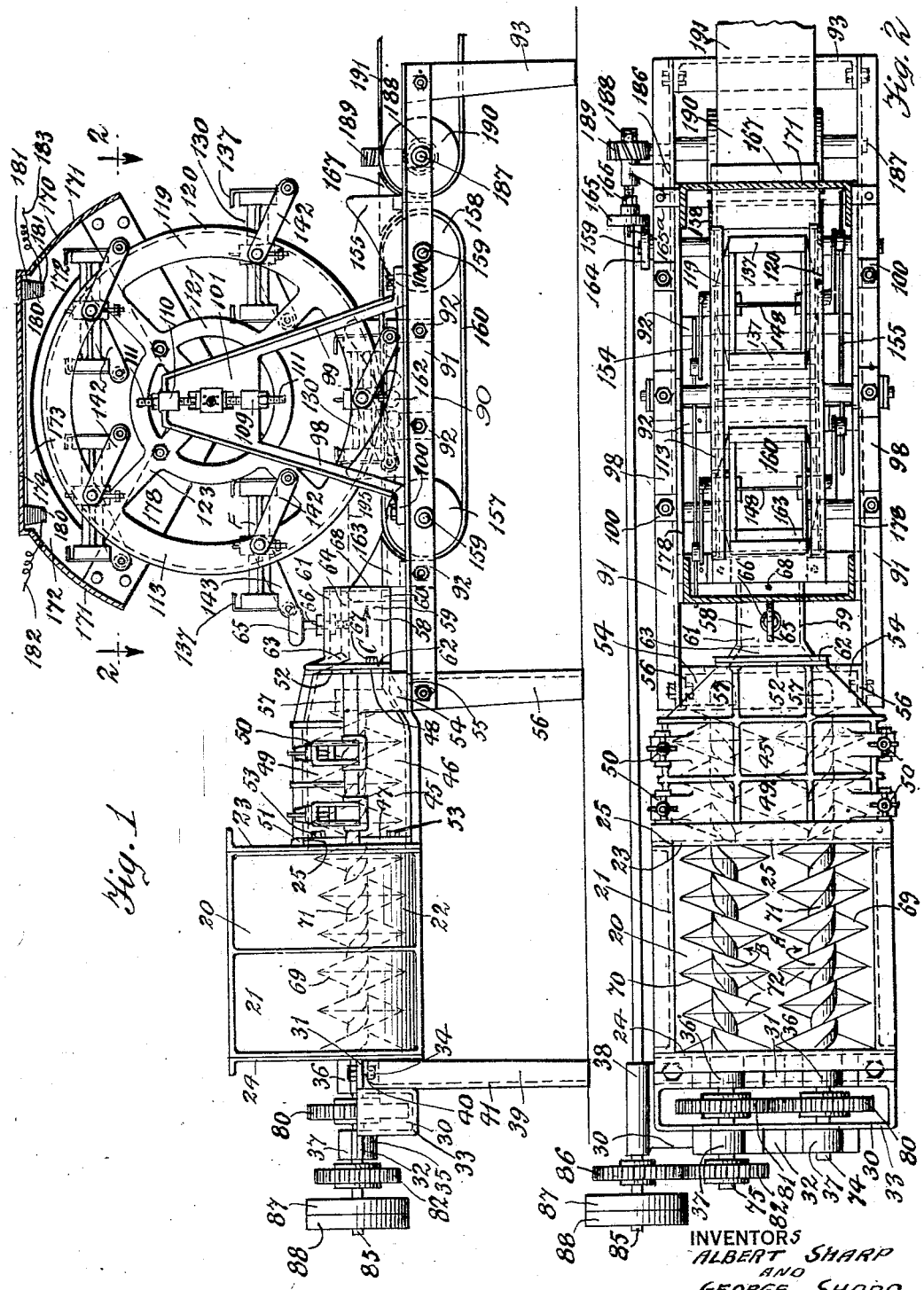

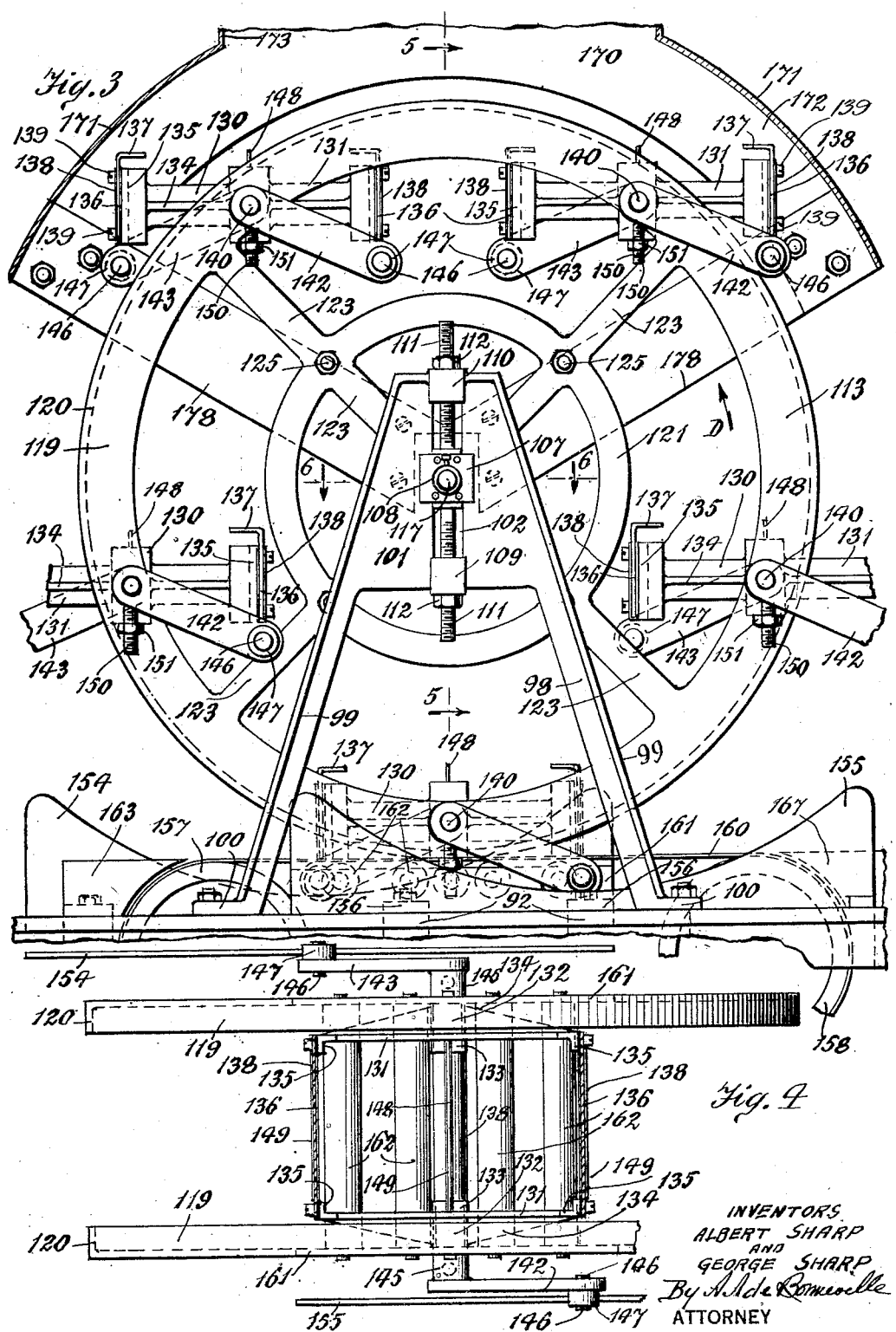

1,848,274

UNITED STATES PATENT OFFICE

ALBERT SHARP AND GEORGE SHARP, OF BAYONNE, NEW JERSEY

BUTTER CUTTING AND BLOCK FORMING MACHINE

Application filed December 27, 1929. Serial No. 416,800.

This invention relates at a butter cutting and block forming machine.

The object of the invention is the production of a machine, by which plastic substances of various kinds can be easily cut or chipped and compressed to a homogeneous mass, and finally cut to form uniform blocks of the same size. The second object of the invention is the production of a machine for forming blocks of plastic materials, in which the adjacent outer surfaces thereof will be at right angles to each other. The third object of the invention is the production of a machine, whereby the cutting elements thereof are always maintained in planes perpendicular to the substances to be cut. The fourth object of the invention is the production of a cutting and block forming machine in which the movement of the substance operated upon in part actuates the means for cutting said substances into blocks of uniform size and weight.

In the accompanying drawings Fig. 1 represents an elevation with a partial vertical longitudinal section of an exemplification of the improved butter cutting and block forming machine; Fig. 2 shows a top plan view and section of Fig. 1 on the line 2, 2; Fig. 3 indicates an enlarged fragmentary portion of Fig. 1; Fig. 4 is a top plan view, part in section of some of the elements indicated in Fig. 3. Fig. 5 represents a left hand view of a portion of Fig. 3 and section of Fig. 3 on the line 5, 5; Fig. 6 shows a partial section of Fig. 3 on the line 6, 6; Fig. 7 is an enlarged top plan view of an element and Fig. 8 shows a top plan view of other elements.

The butter cutting and block forming machine in this instance comprises the filling chamber 20, which at its lower portion is connected to the conveying chamber 45, having the outlet nozzle 58 attached thereto. A rotatable cutter frame 113 is positioned forward of the said nozzle 58. A belt conveyer 160 is located below the frame 113, and a heater 170 is positioned above the said rotatable cutter frame 113.

The filling chamber 20 comprises the side walls 21 which join with the semicylindrical bottom portions 22. A front wall 23 and a rear wall 24 are bolted to the side walls 21 and to said bottom portions 22. The front wall 23 has formed therein the opening 25 that connects the filling chamber 20 and the conveying chamber 45.

The rear wall 24 has formed therewith a supporting frame designated in its entirety by the numeral 30, and comprises the cross plates 31 and 32, between which is formed the pocket having the wall 33. The cross plate 31 has formed therewith a pair of lower members 34 of journal boxes and the cross plate 32 has formed therewith a pair of lower members 35 of journal boxes. Journal caps are shown at 36 and 37. A pair of supporting legs 39 have each formed therewith the head 40 and are connected by a web 41. The heads 40 support and bear up against the cross plate 31 to which they are bolted.

The conveying chamber 45 comprises the lower member 46 having the flanges 47 and 48. The flange 47 is bolted to the wall 23. The member 46 is similar in contour to the lower portions of the walls 21 and the portions 22. A cover or cap 49 semi-circular in contour is provided for the lower member 46 and is clamped thereto by means of the swing clamps 50. Flanges 51 and 52 are formed with the cover 49. The flanges 47 and 51 are bolted to the wall 23 by means of the bolts 53, which are in threaded engagement with the wall 23. The holes in the flange 51 through which the bolts 53 extend are preferably somewhat larger in diameter than the diameters of said bolts.

A pair of supporting lugs 54 extend from the lower member 46 and bear on the heads 55 of the pair of legs 56. From the lower wall of the conveying chamber 45 extend the journal posts 57. The outlet ends of the lower member 46 and the cap 49 converge as indicated in the drawings.

The outlet nozzle 58 bears against the flanges 48 and 52 of the conveying chamber 45. The outlet nozzle 58 comprises the side walls 59, the bottom wall 60, the top wall 61 and the flange 62. A projection 63 extends into the nozzle from the top wall 61. An adjuster 64 is located within the said nozzle. The said adjuster 64 is of the same width as the nozzle. An adjusting screw 65 has formed at its upper end the operating disc 66, and its lower end is in threaded engagement with the adjuster 64. By means of the adjuster the thickness of the material discharged from the outlet nozzle 58 can be varied. The flange 62 is bolted to the flanges 48 and 52 by means of the bolts 67. The openings in the flange 62 opposite the flange 52 are preferably a little larger in diameter than the bolts 67.

A cutting wire 68 is provided for the outlet end of the nozzle.

The invention so far described is similar to the construction shown and described in our Letters Patent for butter cutting and printing machines, No. 1,481,304, dated January 22, 1924.

In the filling chamber 20 and conveying chamber 45 are positioned a pair of helical cutting conveyers 69 and 70, which are respectively right and left. The said conveyers are made in sections, each section comprises the hub 71, from which latter extends the helical blade 72. The body of said blade 72 inclines forwardly toward the outlet end of the machine as clearly shown in Fig. 7, and at its circumferential edge is formed the cutting edge 73. A pair of driving shafts 74 and 75 extend into the chambers 20 and 45. One end of each of said shafts is journaled in one of the journal posts 57 in the chamber 45 and their other ends are journaled in the journal boxes having the journal caps 36 and 37.

The driving shafts 74 and 75 have fastened thereto the hubs 71 of the conveyers 69 and 70 and also have respectively fastened thereto the spur gears 80 and 81, which mesh with each other and extend into the pocket having the wall 33. A spur gear 82 is fastened to the shaft 74 outside of said pocket. A side shaft 85 has one end journaled in the journal bearing 33 and has fastened thereto the spur gear 86, which meshes with the spur gear 82. A pulley 87 is fastened to the side shaft 85 and a loose pulley 88 is supported on said shaft 85.

The table 90 is shown to comprise the two longitudinal angle shaped members 91, which are connected by the U shaped cross bars 92. One end of each of the members 91 is bolted to one of the legs 56. The other ends of the members 91 are supported by the pair of legs 93.

A pair of V shaped journal brackets 98 extend up from the table 90. Each of the brackets 98 comprises the angle shaped inclined members 99, that have formed therewith at their lower ends the feet 100. The latter are bolted to the members 91 of the table 90. A web 101 connects the members 99 at their upper portions. The said web has formed therewith the opening 102 and the guide brackets 103 with the front flanges 104.

A cross-head 105 with the flange 106 is guided in each of the openings 102 and between the guide brackets 103. A front plate 107 having the sleeve 108 extending therefrom is bolted to each cross head 105 and bears against the front flanges 104.

A pair of threaded bosses 109 and 110 are formed with each of the webs 101. A screw 111 is in threaded engagement with each of the bosses 109 and 110 and a jam nut 112 is provided for each of said screws. The adjacent ends of each pair of screws 111 bear against the horizontal faces of the cross heads 105.

The rotatable cutter frame 113 comprises the axle 114, which at its ends has formed therewith the tapered bearings 115, which engage the tapered ends 116 of the spindles 117 that are supported in the cross heads 105.

The axle 114 has fastened thereto the supporting wheels which each comprises the outer rim 119 with the flange 120, the inner rim 121 and the hub 122. The said rims and hubs are connected by the spokes 123. The hubs 122 are fastened to the axle 114 by means of screws 124. The rims 121 are connected by the bolts 125. To the rim 119 are pivoted a plurality of knife holders each designated in its entirety by the numeral 130. Each of the holders 130 comprises a pair of side frames 131. Each of the frames 131 has extending therefrom the outer boss 132 and the inner boss 133. Each of the frames 131 has formed therewith the ribs 134, and an angle shaped vertical flange 135 at each of its ends. Each pair of the flanges 135 at the ends of the frame has fastened thereto the knife blade 136 having the flange 137 at its upper end. Each blade 136 has secured thereto the cover of wax paper 138. The blades 136 and the cover of wax paper 138 are fastened to the flanges 135 by means of the screws 139, see Fig. 3. A pair of pins 140 for each holder 130, are pivoted in the rims 120. Each boss 132 is fastened to its accompanying pin 140. Similar oppositely inclined controlling arms 142 and 143 are provided for the opposite sides of the holders 130. Each of the arms 142 and 143 has formed therewith at its inner end the hub 145 which is fastened to its accompanying pin 140.

At the outer end of each of the arms 142 and 143 is fastened a journal pin 146. A guide roller 147 is journaled on each pin 146. It will be noted that each of the arms 142 and 143 inclines from the pins 140 to locate the center of gravity of each holder 130 below the axial center line of said pins 140. A third knife blade 148 has its ends fastened to the inner bosses 133 of each holder in the notches thereof, as indicated in Fig. 4. A cover of wax paper 149 covers each of the blades 148, and has its ends securely fastened in the notches of the bosses 133. A screw 150 extends from each hub 145 and has in threaded engagement therewith the counter weight 151. Similar guide track plates are indicated at 154 and 155. Each of said plates has formed therewith a foot 156 which is fastened to a pair of the cross bars 92. It will be noted that the guide plates 154 and 155 are not opposite each other, but that the guide plate 155 is spaced forwardly relatively to the guide plate 154. The guide roller 147 of the arm 143 coacts with the guide track plate 154, and the guide roller 147 of the arm 142 coacts with the guide track plate 155.

A pair of pulleys 157 and 158 are fastened to the cross shafts 159 and the latter are journaled in the angle shaped members 91 of the table 90. A belt conveyer 160 engages the pulleys 157 and 158. Brackets 161 are supported upon and fastened to the cross bars 92 and have journaled therein a plurality of rollers 162. The said rollers 162 bear up against the under face of the upper member of the belt conveyer 160. A guide block 163 is located adjacent to the outlet end of the outlet nozzle 58 and is supported on and fastened to one of the cross bars 92. The shaft 159 of the pulley 158 has fastened thereto the cylindrical disc 164, and the side shaft 85 has supported thereon the similar disc 165, which is slidable on the feather 165ª extending from side shaft 85. One of the faces of the latter disc bears against the cylindrical face of the disc 164. A nut 166 in threaded engagement with the shaft 85 bears against the hub of the disc 165 to control the pressure between the two discs. A block 167 is supported on and fastened to the members 91 adjacent to the pulley 158.

An electric heater 170 extends over the upper portion of the cutter frame 113 and comprises the umbrella shaped hood having the curved side walls 171 and the front and rear walls 172. A projection 173 having the top wall 174 extends up from said walls. Brackets 178 have one end of each fastened to one of the side walls 171 and the other end of each bracket is fastened to the web 101 of its accompanying V shaped journal bracket 98. Supporting fixtures 180 of electric insulating material extend from the top wall 174 for the coils of wire 181. Wires 182 and 183 connect the coils 181 and a source of electric current.

A journal bracket 186 is fastened to one of the longitudinal angle shaped members 91, for the forward end of the side shaft 85. A cross shaft 187 is journaled in the members 91 and has fastened thereto a spiral gear 188. A spiral gear 189 is fastened to the side shaft 85 and meshes with the spiral gear 188.

A pulley 190 is fastened to the cross shaft 187. A conveyer belt 191 engages the pulley 190 and its other end engages a second pulley, not shown.

To operate the butter cutting and block forming machine, a belt, not shown, rotates the tight pulley 87 and thereby the shafts 74 and 75 with their appurtenances are turned in the direction of the arrows A and B indicated in Fig. 2.

The operator then inserts the plastic substance to be operated upon into the filling chamber 20. The cutting edges 73 of the helical conveyers 69 and 70 cut the substance operated upon into small portions. The conveyers force the portions of the substance operated upon to the outlet end of the outlet nozzle 58, and at the same time the portions of the substance are compressed into a homogeneous mass. The said mass is divided into two longitudinal portions by means of the cutting wire 68, and is discharged from said outlet nozzle 58. The portions discharged are rectangular in cross section. The two rectangular portions 195 of the plastic material are deposited upon the guide block 163, and from thence move upon the top member of the belt conveyer 160 which conveys the portions 195 in the direction of the arrow C. The flanges 120 of the supporting wheels of the cutter frame 113 bear on the top face of the conveyer belt 160, and thereby the cutter frame 113 is turned to locate the holders in proper position one after the other, to sever the rectangular portions 195 to the requisite length. When the knife blades 136 and 148 descend upon the portions 195 of the plastic material to sever the same into blocks, they also move forwardly in the direction of the arrow C and the ends of the blocks formed are maintained perpendicular to the top and bottom faces thereof.

Before a knife holder 130 rises and moves away from the conveyer belt 160 and the next knife holder 130 indicated at F lowers into position upon the portions 195 of the substance operated upon, and its knife blades 136 and 148 descend into said portions in directions perpendicular thereto. The knife blades are maintained in their vertical positions by the contacting of the guide rollers 147 with their adjacent guide track plates 154 and 155. It will be noted that theoretically the guide track plates 154 and 155 could be dispensed with. The knife holders 130 during the rotations of the cutter frame 113 automatically maintain the knife blades 136 and 148 in vertical planes. The counterweights 151 assist in maintaining the knife holders 130 in proper position to maintain the knife blades in vertical planes. The covers of wax paper 138 and 149 prevent the substances acted upon from sticking to the knife blades 136 and 148. As the knife blades descend to their lowest position they cut the substance operated upon into blocks. When the knife holders 130 with their blades pass through the electric heater 170, the blades 136 and 148 are slightly heated so as to easily sever the substance operated upon. When the electric heater 170 is used the covers of wax paper for the knife blades 136 and 148 are not used. It is to be understood that the guide track plates 154 and 155 do not function as cams.

The belt conveyer 160 can be dispensed with and the rotatable cutter frame 113 in such a case would be driven by the portions 195 of the substance operated upon after it is discharged from the outlet nozzle 58, contacting with the knife blades 136 and 148.

When the belt conveyer 160 is used, the appurtenances that drive the same must be proportioned, so that its linear speed equals the speed of the portions 195 of the substance operated upon as it is discharged from the outlet nozzle 58.

When the belt conveyor 160 is dispensed with the guide blocks 163 and 167 must be made long enough so that their adjacent ends meet to form a platform for the portions 195.

It will be noted that the pins 140 are disposed in the rims 119 of the supporting wheels, so that when three knife holders 130 assume their relative lowest position, they will be a predetermined distance apart, that is to say the rear knife blade 136 of the central knife holder will be distant from the forward knife blade 136 of the next succeeding knife holder a distance equal to the distance between a pair of its knife blades 136 and 148, and the distance of the forward knife blade 136 of the central knife holder will be the same distance apart from the rear knife blade 136 of the forward knife holder. This disposition is necessary so that the blocks of the substance formed between the knife holders will be equal in length to the blocks of the substance formed by the knife blades of each knife holder.

When the disc 165 does not bear against the disc 164 with a predetermined amount of pressure, a certain slippage results between the discs 164 and 165, and consequently just the requisite amount of energy may be imparted to the movement of the belt 160, and consequently to the movement of the portions 195, so that the energy imparted to the movement of said portions 195 in addition to its initial movement when discharged from the nozzle 58, will suffice to rotate the cutter frame 113. The discs 164 and 165 function as a friction clutch.

Various modifications may be made in the invention and the present exemplification is to be taken as illustration and not limitation thereof.

Having described our invention what we desire to secure by Letters Patent and claim is:

1. In a cutting and block forming machine the combination of means to cut a substance operated upon into small portions and compressing said portions to a homogeneous mass, a rotatable cutter frame, journaled adjacent to said means, means to move said homogeneous mass under said cutter frame, knife holders pivotally connected to said cutter frame, knife blades supported in each holder, means to maintain said knife blades in vertical planes and perpendicular to said homogeneous mass and a belt conveyer contacting with said cutter frame to turn the latter while said mass is moving.

2. In a machine of the character described the combination of a cutter frame, the said cutter frame comprising a pair of wheels, an outer rim for each wheel, a flange formed with said rim, a plurality of knife holders pivotally supported in said rims, knife blades supported in each of said holders, a belt conveyer positioned below said wheels, the flanges of said rims contacting with said conveyer and means to drive the belt conveyer.

3. In a machine of the character described the combination of a rotatable cutter frame, means to move a substance operated upon to said cutter frame, said cutter frame comprising an axle, means to rotatably support said axle, means to vary the level of said axle, a pair of supporting wheels fastened to said axle, a plurality of pairs of pins pivoted to said wheels, a knife holder for each pair of said pins, each knife holder comprising a pair of frames, an outer boss and an inner boss extending from each frame of each knife holder, a knife blade connecting the ends of each pair of frames of each knife holder, a knife blade having its ends fastened to the inner bosses of each pair of frames of each knife holder, a pair of controlling arms for each knife holder, a hub formed with one end of each controlling arm, a guide roller journaled to the other end of each controlling arm, a guide track plate positioned below each of said wheels adapted to contact with one of said guide rollers of each controlling arm, a screw extending from the hub of each controlling arm and a counter weight supported on each screw.

Signed at Bayonne, in the county of Hudson and State of New Jersey, this 6th day of December, A. D. 1929.

ALBERT SHARP.
GEORGE SHARP.